Patented Oct. 8, 1929

1,730,518

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

PROCESS FOR TREATING RUBBER DISPERSIONS AND PRODUCTS OBTAINED THEREBY

No Drawing.   Application filed March 15, 1927.   Serial No. 175,640.

The present invention relates to methods for improving the stability of rubber dispersions and particularly of aqueous dispersions of rubber, including the natural rubber latex. The invention is also concerned with the products obtained by the process. More particularly the invention relates to methods for increasing the stability of rubber latex by the addition of materials which are solvents for resin, but not solvents for rubber, this class of materials including, among others, alcohols and ketones.

Reference to the literature dealing with the recovery of rubber from latex indicates that alcohols and ketones have been generally regarded as coagulating agents, and occasional use has been made in the past of this property. It is of course understood that the continued use of materials such as alcohols, and even the commoner alcohols will be determined by the cost. As the production of rubber increased, it soon developed that the alcohols were far too expensive to use in large scale rubber manufacture. More recently it has been suggested that certain of the resinous bodies normally present in rubber latex probably function to preserve the latex in the form of a suspension or dispersion, and that their removal or alteration results in a coagulation of the dispersion, or at least a disruption of its stability. Nowhere in the literature has it been recognized that the alcohols and ketones, which are comprehended by the expression "resin solvents but not rubber solvents" have properties other than that of coagulating latex, and more particularly that such alcohols and ketones when added in the manner hereinafter described actually possess a diametrically opposite property, that of imparting stability to the latex.

It has now been discovered that under certain conditions alcohols and ketones, which are representatives of a class of materials having the property of dissolving resins but not rubber may be added to rubber latex in such a way as to increase the mechanical stability of the latex, that is, to increase the resistance of the latex against coagulation.

Accordingly the objects of the invention may be generally stated as being concerned with methods for increasing the mechanical stability of latex or rubber dispersions.

One object is to provide a simple method for increasing the stability of such dispersions. Another object is to provide a method for improving the mechanical stability of rubber latex without introducing thereinto a material which may be undesirable in the rubber derived from such latex. A further object is to increase the stability of a rubber latex so that it may be handled with even more safety than the customary ammonia preserved latex may be handled. A further object is to provide a method for preventing bacterial fermentation in latex. A still further object is to provide a new method for preserving natural rubber latex. Another object is to provide a method for increasing the stability of rubber latex, whereby the latex may be concentrated to a higher degree without materially increasing the viscosity of the latex.

Having a preferred procedure in mind, but without intent to limit the invention beyond what may be required by the prior art, the invention briefly stated consists in treating a rubber dispersion which may or may not contain alkali with a diluted resin solvent in which rubber is substantially insoluble. The invention also includes treating natural rubber latex with an alkali and a quantity of a diluted resin solvent which does not dissolve rubber. The invention comprehends the use of alcohols and ketones as members of this class of solvents.

One manner of carrying out the invention is as follows:—To 100 ccs. of natural rubber latex containing 20% of solid material and ½–1½% of ammonia is added 2% by volume of ethyl alcohol diluted to 50% strength. It is desirable to stir the latex during the addition of the alcohol in order to secure uniform distribution. This latex, as soon as it has been so treated is approximately twice as stable as the same kind of latex containing the ammonia but no alcohol. It is a property of the treated latex, subject of this invention, to increase in its mechanical stability upon standing. For example after a month the treated latex is four times as stable as the untreated ammonia preserved latex. The percentage of diluted alcohol may of course be varied. With 4% in the above example instead of 2%, the stability of the latex when freshly treated is three times that of the untreated latex. After thirty days standing the stability is six times as great as that of the untreated latex. With 8% of dilute alcohol the stability of the freshly prepared latex is seven times that of the untreated latex, while in thirty days the stability has increased to ten times that of the untreated ammonia preserved latex.

It is of course to be understood that these figures of stability are comparative. For the purpose of this invention such relative figures may be easily and very satisfactorily obtained in the following manner: A quantity of latex is placed in a vessel fitted with a motor driven stirring device. Means for observing the power consumption of the stirring device are provided. In carrying out the test the stirrer is started and the power consumption watched. As long as the power consumption remains approximately constant the latex is remaining uncoagulated, that is the latex is stable. When the power consumption commences to increase either slowly or rapidly, this is evidence of the formation of coagulation in the latex and consequently marks the end of the stability period. By simple observation of the length of time from the start until the increase in power consumption is noted, a relative figure of mechanical stability is obtained. It will be found, however, that these figures are born out in actual practice. If this stability test is carried out in a transparent vessel, such as a glass vessel, then the stability time can be easily observed by noticing coagulum formation. The note emitted by the stirrer changes sharply at this point and gives another sure indication of the stability time.

Other alcohols which may be similarly used, and have the property of dissolving resins but not rubber are methyl, iso propyl, amyl, iso amyl, iso butyl, butyl allyl, alcohols, all of which are monohydric. They may be used in amounts ranging from 1% upwards, although for most purposes 8–10% will be sufficient, and usually considerably less than this amount is required. The alcohols are to be added in dilute condition, for example as 10, 25 or 50% alcohols. In the case of the higher alcohols which have a lower solubility in water, it is quite satisfactory to add these higher alcohols in the form of the limit concentration of these alcohols in water. It is also satisfactory to add the less soluble alcohols in the form of a water emulsion, this method being particularly applicable when it is not desirable to increase the dilution of the latex. For example iso amyl alcohol is soluble in water to the extent of about 3%.

To introduce this as solution would entail introduction of a considerable amount of water. The alcohol in the quantity required, say 1% on the latex, may be thoroughly shaken with a very small amount of water, say two or three times the volume of the alcohol, and this emulsion immediately stirred into the latex.

To illustrate the invention as applied to ketones, 2% acetone may be added to 100 ccs. of latex containing ½–1½% of ammonia. The stability of the freshly prepared latex, determined as above described, is twice that of the untreated latex. With 4% of acetone the stability may be expressed as four to one. With 8% of acetone the stability is five to one. Other ketones may be used instead of acetone, methyl ethyl ketone being one illustration. It appears, as stated above, that this property of increasing the stability is related to the solution power of the material, that is the materials dissolve resins, but do not dissolve rubber.

Ammonia has been given in the above illustrations as alkaline material. It is also possible to employ the other alkaline materials, including the fixed alkalies, these being required in only small amounts. It is preferable to have the alkali present in the latex before the alcohol of ketone etc. be introduced. It appears that the concentration of the alcohol of ketone may be varied within rather wide limits. For ethyl alcohol the range is from 1% to approximately 80%. Above this, there is a tendency towards incipient coagulation. As 85% and upwards coagulation occurs when ethyl alcohol is added to latex. The stability of the latex is increased both by the use of increasing amounts of the alcohol of ketone or by the time elapsed before testing. Stability also increases as the molecular weight of the alcohol or ketone increases. This will be clearly observable in the following table:

| Substance added | Per cent | Concentration of latex | Stability in min. (pres.) | Stability after 30 days |
|---|---|---|---|---|
| Control (untreated) | | 20 | 9 | 11 |
| Methyl alcohol | 1 | 30 | | 36 |
| Methyl alcohol | 4 | 30 | | 25 |
| Methyl alcohol | 6½ | 25 | 27½ | |
| Ethyl alcohol | 1 | 20 | 14 | 40 |
| Ethyl alcohol | 2 | 20 | 19 | |
| Ethyl alcohol | 3 | 20 | 22 | |
| Ethyl alcohol | 4 | 20 | 26 | 66 |
| Ethyl alcohol | 8 | 20 | 65 | 131 |
| Iso propyl alcohol | 1 | 30 | | 32 |
| Iso propyl alcohol | 4 | 30 | | 70 |
| Iso propyl alcohol | 6½ | 25 | 63 | |
| Butyl alcohol | 1 | 30 | | 41 |
| Iso amyl alcohol | 1 | 30 | | 52 |
| Acetone | 1 | 30 | | 35 |
| Acetone | 2 | 20 | 18 | 38 |
| Acetone | 4 | 30 | | 40 |
| Acetone | 4 | 20 | 37 | |
| Acetone | 8 | 20 | 43 | |
| Methyl ethyl ketone | 4 | 30 | | 43 |
| Methyl ethyl ketone | 6½ | 25 | 43 | |
| Glycerine | 4 | 30 | 8 | |

Glycerine has been included in the above table to illustrate the fact that an alcohol which is not resin solvent does not increase the stability. As a matter of fact glycerine has been proposed in the prior art as a coagulant.

The properties of the latex treated as above described are briefly as follows: Higher concentration of solids in the latex with lower relative viscosity; increased stability towards mechanical action such as agitation, pumping, handling, compounding; low cost; reduced tendency towards putrefaction due to bacterial action; (1% of iso amyl alcohol or 1½% of butyl alcohol or 4% of iso propyl alcohol afford good protection against bacterial action over considerable lengths of time); increased stability without the introduction of inorganic matter or ash in the rubber; increased speed of separation into layers when treated with hydrophylic colloids such as Irish moss; lower surface tension in the latex as measured against oil; a more uniform rubber film; greater penetration of fibrous materials such as paper, felt, cloth, etc.

"Mechanical stability" may be defined as the resistance to coagulation that latex offers to any form of mechanical energy or treatment such as stirring, pumping, spreading and similar operations.

Having thus described my invention, what I claim and desire to protect by Letters Patent is:

1. Process for treating latex which comprises adding to rubber latex a resin solvent in which rubber is substantially insoluble, and an alkaline material, and maintaining an uncoagulated state thereby, to produce a rubber latex of increased mechanical stability.

2. Process for treating latex which comprises adding to a rubber latex an alkaline material in solution and a diluted resin solvent in which rubber is substantially insoluble, maintaining an uncoagulated state thereby, and thus increasing the mechanical stability of said rubber latex.

3. A method of increasing the mechanical stability of rubber latex which comprises treating the latex with a solution of an alkaline material and a diluted aliphatic solvent having the property of dissolving resin but not rubber and maintaining an uncoagulated state thereby.

4. A method for increasing the mechanical stability of rubber latex which comprises treating the latex with a solution of an alkaline material and adding thereto a diluted alcohol capable of dissolving resin but not rubber.

5. A method for increasing the mechanical stability of rubber latex which comprises treating an alkaline preserved latex with a diluted aliphatic alcohol, said alcohol being a good resin solvent in which rubber is substantially insoluble.

6. A method for increasing the mechanical stability of rubber latex which comprises treating rubber latex containing an alkaline material with a diluted ethyl alcohol.

7. A method for increasing the mechanical stability of rubber latex which comprises treating rubber latex containing ammonia with a solution of ethyl alcohol containing less than approximately 80% of alcohol.

8. As a new product uncoagulated rubber latex containing an alkaline material and a resin solvent in which rubber is substantially insoluble, said latex being characterized by a high degree of mechanical stability.

9. As a new product uncoagulated rubber latex containing an alkaline material and a dilute resin solvent in which rubber is substantially insoluble, said latex being characterized by a mechanical stability at least twice as great as that of ammonia preserved latex.

10. As a new product uncoagulated rubber latex containing an alkali and an aliphatic resin solvent in which rubber is substantially insoluble, said latex being characterized by greater mechanical stability than ammonia preserved latex under identical conditions of handling.

11. As a new product uncoagulated rubber latex containing an alkaline material and an alcohol of the saturated series, said latex being characterized by greater mechanical stability than ammonia preserved latex.

12. As a new product a stable uncoagulated rubber latex containing ammonia and ethyl alcohol in excess of 1% by volume, said latex being characterized by a mechanical stability greater in excess of that of ammonia preserved latex.

Signed at New York, county and State of New York, this 10th day of March, 1927.

JOHN McGAVACK.